(12) United States Patent
Loda

(10) Patent No.: US 8,082,317 B2
(45) Date of Patent: Dec. 20, 2011

(54) REMOTE TABLET-BASED INTERNET INSPECTION SYSTEM

(75) Inventor: David C. Loda, Bolton, CT (US)

(73) Assignee: United Technologies Corporation, Hartford, CT (US)

( * ) Notice: Subject to any disclaimer, the term of this patent is extended or adjusted under 35 U.S.C. 154(b) by 1989 days.

(21) Appl. No.: 10/082,958

(22) Filed: Feb. 26, 2002

(65) Prior Publication Data

US 2003/0163591 A1 Aug. 28, 2003

(51) Int. Cl.
G06F 15/16 (2006.01)

(52) U.S. Cl. .......... 709/217; 702/34; 382/141; 382/152; 348/82; 356/241.1

(58) Field of Classification Search .................. 709/217, 709/219, 250; 348/141, 82–85, 207.1; 340/539.1; 382/141, 152; 356/237.1, 241.1–241.5; 318/568.12
See application file for complete search history.

(56) References Cited

U.S. PATENT DOCUMENTS

| | | | |
|---|---|---|---|
| 5,657,245 A * | 8/1997 | Hecht et al. ............ 700/287 |
| 5,778,381 A | 7/1998 | Sandifer |
| 5,828,969 A * | 10/1998 | Chamney et al. ............ 701/29 |
| 5,838,261 A | 11/1998 | Lauta et al. |
| 5,884,202 A | 3/1999 | Arjomand |
| 5,931,877 A | 8/1999 | Smith et al. |
| 5,931,878 A | 8/1999 | Chapin |
| 6,047,165 A | 4/2000 | Wright et al. |
| 6,104,914 A | 8/2000 | Wright et al. |
| 6,108,523 A | 8/2000 | Wright et al. |
| 6,112,246 A | 8/2000 | Horbal et al. |
| 6,148,179 A | 11/2000 | Wright et al. |
| 6,154,636 A | 11/2000 | Wright et al. |
| 6,154,637 A | 11/2000 | Wright et al. |
| 6,353,734 B1 | 3/2002 | Wright et al. |
| 6,449,103 B1 * | 9/2002 | Charles ............ 359/725 |
| 6,487,479 B1 | 11/2002 | Nelson |
| 6,522,867 B1 | 2/2003 | Wright et al. |
| 6,529,620 B2 | 3/2003 | Thompson |
| 6,574,672 B1 * | 6/2003 | Mitchell et al. ............ 709/250 |
| 6,577,339 B1 * | 6/2003 | Thompson et al. ...... 348/211.14 |
| 6,663,559 B2 * | 12/2003 | Hale et al. ............ 600/118 |
| 6,731,988 B1 * | 5/2004 | Green ............ 700/3 |
| 6,816,088 B1 * | 11/2004 | Knoska et al. ............ 340/984 |
| 6,831,556 B1 * | 12/2004 | Boykin ............ 340/539.1 |
| 6,850,817 B1 * | 2/2005 | Green ............ 700/245 |
| 7,068,301 B2 * | 6/2006 | Thompson ............ 348/141 |
| 2001/0036822 A1 | 11/2001 | Mead et al. |
| 2001/0044751 A1 * | 11/2001 | Pugliese et al. ............ 705/26 |
| 2002/0010734 A1 * | 1/2002 | Ebersole et al. ............ 709/201 |
| 2002/0018008 A1 | 2/2002 | Wright et al. |
| 2002/0059614 A1 | 5/2002 | Lipsanen et al. |
| 2002/0087992 A1 | 7/2002 | Bengeult et al. |
| 2002/0095476 A1 | 7/2002 | Craik |

(Continued)

FOREIGN PATENT DOCUMENTS

CN 2473811 Y 1/2002

(Continued)

*Primary Examiner* — Greg C Bengzon
(74) *Attorney, Agent, or Firm* — Bachman & LaPointe, P.C.

(57) ABSTRACT

An integrated system comprising a portal, a server communicating with the portal and at least one local area network, at least one mobile platform in wireless communication with the at least one local area network, and a means for enabling two-way communications between the portal and the server.

17 Claims, 1 Drawing Sheet

U.S. PATENT DOCUMENTS

| | | | |
|---|---|---|---|
| 2002/0111720 | A1 | 8/2002 | Holst et al. |
| 2002/0118137 | A1 | 8/2002 | Halsema et al. |
| 2002/0123915 | A1 | 9/2002 | Denning et al. |
| 2002/0143443 | A1 | 10/2002 | Betters et al. |
| 2002/0160773 | A1 | 10/2002 | Gresham et al. |
| 2002/0168975 | A1 | 11/2002 | Gresham et al. |
| 2002/0178451 | A1 | 11/2002 | Ficco |
| 2003/0009761 | A1 | 1/2003 | Miller et al. |
| 2003/0014426 | A1 | 1/2003 | Gimbert et al. |
| 2003/0032426 | A1 | 2/2003 | Gilbert et al. |
| 2003/0048471 | A1 | 3/2003 | Lundgren |
| 2003/0064714 | A1 | 4/2003 | Sanford et al. |
| 2003/0084451 | A1 | 5/2003 | Pierzga |
| 2003/0085818 | A1 | 5/2003 | Renton et al. |
| 2003/0093798 | A1 | 5/2003 | Rogerson |
| 2003/0100978 | A1 | 5/2003 | Wright et al. |
| 2005/0065400 | A1* | 3/2005 | Banik et al. .............. 600/109 |

FOREIGN PATENT DOCUMENTS

| | | |
|---|---|---|
| DE | 20018926 | 2/2001 |
| EP | 1 148 703 | 10/2001 |
| WO | WO 01/24473 | 4/2001 |
| WO | 01/80494 A1 | 10/2001 |
| WO | WO 01/80494 | 10/2001 |

* cited by examiner

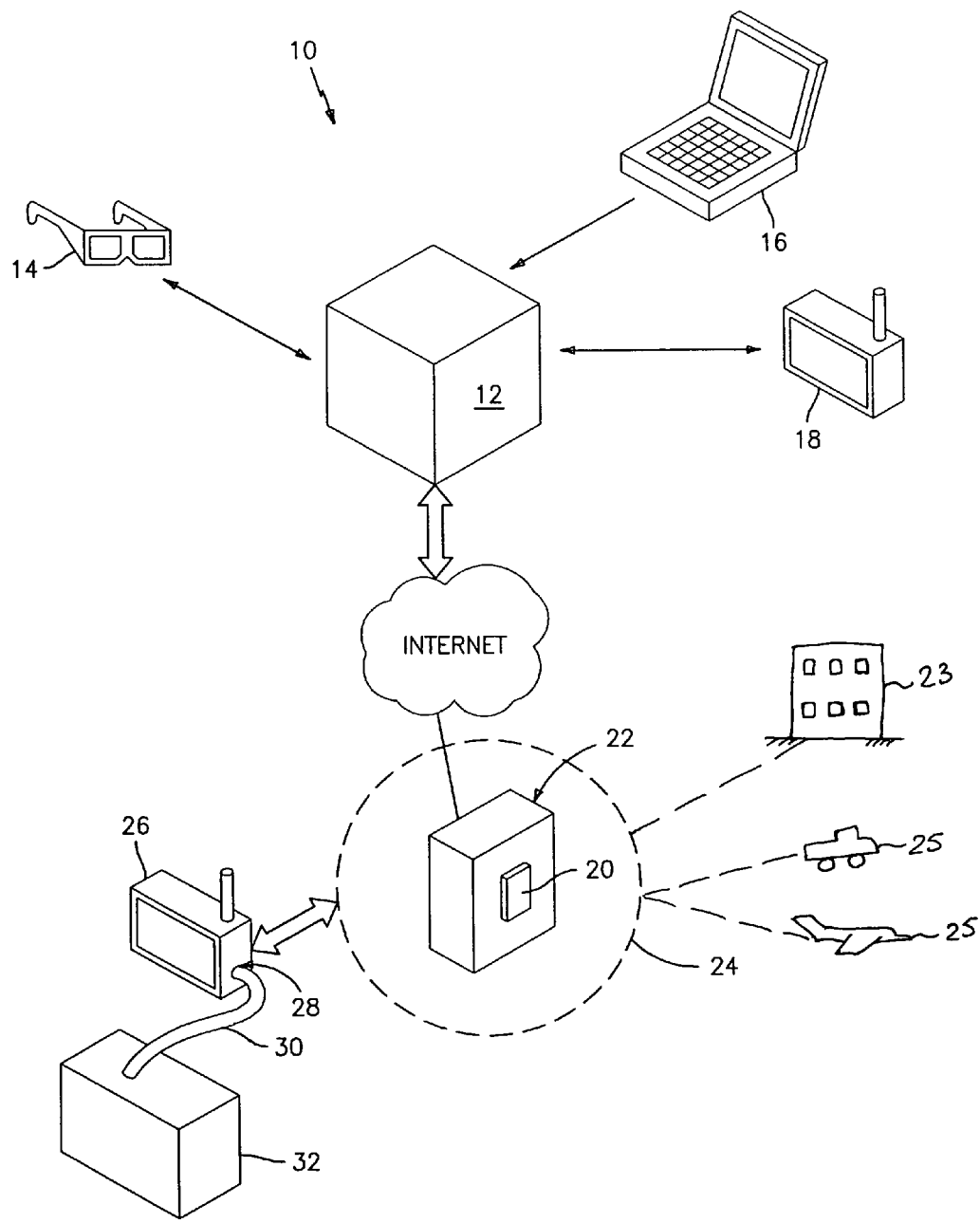

REMOTE TABLET-BASED INTERNET INSPECTION SYSTEM

BACKGROUND OF THE INVENTION (1) Field of the Invention

The present invention relates to a system for remotely monitoring a deployed product, gathering data about the deployed product, and disseminating the data to interested parties. More specifically the present invention is drawn to a system for enabling remote acquisition of visual data via a wireless LAN and internet architecture and interactively making use of such data.

(2) Description of Related Art

There exists in industry dedicated servers forming portals through which communities of users may communicate with one another. Often times, users sharing a common attribute may have partitioned access to subsets of the data contained upon the server. For example, engineers might form a community of users with restricted access to engineering data and may be capable of entering a chat room hosted on the server. When such a portal is in communication via the internet with other servers having unique IP addresses, users of the portal may gain access to servers located around the world.

There also exists a need for individuals or groups of individuals to access information related to various apparatus. For example, aerospace engineers engaged in the design and testing of aircraft engines have a need to receive detailed data related to the condition and performance of engines deployed in the field. In particular, it would be useful to receive detailed visual data related to the condition of an engine or other apparatus and to interactively direct the acquisition of such data. Unfortunately, it is often both time consuming and expensive to gather such data from deployed apparatus.

There therefore exists a need for a system to allow remote users of a portal architecture to gain access, via a network, to devices capable of acquiring visual data related to the condition and performance of deployed apparatus wherever they are located. There additionally exist a need for users of such a system to be able to interactively issue control commands capable of guiding the acquisition of such visual data.

SUMMARY OF THE INVENTION

Accordingly, it is an object of the present invention to provide a system for remotely monitoring a deployed product, gathering data about the deployed product, and disseminating the data to interested parties.

An additional object of the present invention is to provide a system for enabling remote acquisition of visual data via a wireless LAN and internet architecture and interactively making use of such data.

Yet another object of the present invention to provide an integrated system comprising a portal, a server communicating with the portal and at least one local area network, at least one mobile platform in wireless communication with the at least one local area network, and a means for enabling two-way communications between the portal and the server.

It is another object of the present invention to provide a method for providing remote, interactive visual analysis of an apparatus, comprising the steps of providing a portal, the portal in communication with at least one electronic device, providing a server in two-way communication with the portal via the internet, integrating the server into a wireless local area network, connecting at least one mobile platform to the local area network, providing visual data from at least one visual device to the at least one mobile platform, and receiving the visual data at the at least one electronic device.

BRIEF DESCRIPTION OF THE DRAWINGS

The FIGURE A schematic diagram of the integrated system of the present invention.

DETAILED DESCRIPTION OF THE PREFERRED EMBODIMENT(S)

Referring now to the FIGURE, a system 10 is presented which is capable of remotely monitoring a deployed product, gathering data about the deployed product, and disseminating the data to interested parties. Of particular note is the ability of system 10 to remotely acquire visual information pertaining to a deployed product, to allow for the remote viewing of such visual data, and to provide two-way communications between the viewer of such data and the instrument acquiring the data. System 10 is also capable of monitoring and restricting interested parties' access to its data, and can transmit command instructions from a remote viewer to alter the operation of the visual data acquiring instrument. As used herein, the term "deployed product" has broad applicability and refers to any product, component, or system. For example, the deployed product may be a propulsion system on a vehicle, a compartment of a vehicle, or a braking system for a vehicle.

The system 10 includes a server 22. As used herein, the term "server" refers to any and all devices capable of storing and disseminating data to at least one other electronic device. The server 22 may be provided with its own web address, a firewall, and security protocols known only to selected individuals, such as the manufacturer of the deployed product. Examples include, but are not limited to, personal computers, microservers, and dedicated servers.

In a preferred embodiment, server 22 is deployed in a stationary structure 23 such as the floor of a hangar or vehicle assembly plant. In another embodiment, server 22 may be located upon a moveable platform 25. The movable platform 25 may be a boat, an airplane, a spacecraft, an automobile, a truck, or any other entity that is movable.

The server 22 is in communication with wireless LAN access point 20. Wireless LAN access point 20 serves to create a wireless local area network (LAN) 24. In operation, wireless LAN 24 establishes a perimeter about wireless LAN access point 20. Electronic devices, including server 22, within the perimeter established by wireless LAN 24 may logon to wireless LAN 24 and communicate via wireless LAN 24 with other electronic devices similarly logged on to wireless LAN 24. In a preferred embodiment wireless LAN access point 20 is physically mated to server 22. In such an instance, wireless LAN access point 20 may be, for example, an 802.11B wireless LAN card. However, other examples of wireless LAN access point 20 include any and all devices which may be located remote from server 22, which can communicate with server 22, and which are capable of establishing wireless LAN 24.

The server 22 may monitor the condition of and/or gather data about a deployed product in a number of ways. Server 22 may be connected via wireless LAN 24 to a mobile device 26. In a preferred embodiment, mobile device 26 is a wireless PC tablet capable of wireless communication with wireless LAN 24. Mobile device 26 may be carried or otherwise moved while in communication with wireless LAN 24 and thereby maintain the ability to communicate with server 22. Attached to mobile device 26 may be a visual data device 32. Visual data device 32 acquires visual data pertaining to a deployed product and communicates the data to mobile device 26. In one embodiment, visual data device 32 is a borescope. In another embodiment, visual data device 32 is a stereo image lens capable of capturing and communicating stereo images to mobile device 26. In a preferred embodiment, visual data device 32 communicates with mobile device 26 through connection 30. Connection 30 is a physical connection including, but not limited to, an s-video connection or a data feed wire. Connection 30 inputs information from visual data device 32 to mobile device 26 via input point 28. In a preferred embodiment, input point 28 is a USB port integrated into mobile device 26.

Configured as described, visual data device 32 acquires visual data about a deployed product, communicates the data to mobile device 26 whereby mobile device 26 communicates the data to server 22 via wireless LAN 24.

The server 22 may be programmed in any suitable language known in the art to gather the data about the deployed product and present the data to interested parties in a desired format. For example, the server 22 may be used to host a web page which provides information about one or more deployed products. The web page may have a menu which allows an interested party to gain access to gathered data about a particular deployed product. The data about the deployed product(s) may be organized on the server 22 and presented in any desirable format or manner. The server 22 may also be programmed to allow an interested party to carry out diagnostic operations on the deployed product(s) and/or to issue commands to visual device 32 via wireless LAN 24 and mobile device 26.

In accordance with the present invention, the server 22 is capable of being accessed by interested parties via a portal 12 and the Internet or world wide web. To this end, the server 22 may have a communications device, such as a modem, built within it to allow communication between the server 22 and the portal 12. The communication device may allow for radio frequency communications such as cellular communication, satellite communication, and/or wireless communication between the server 22 and the portal 12. In addition, communications between the server 22 and the portal 12 may be achieved by optical means such as an infrared link.

The portal 12 is hosted by an external server which may be any suitable server known in the art. The server hosting the portal 12 also has appropriate communication means associated with it to allow it to gain access to and be accessed by the server 22.

The portal 12 may be provided with a number of software tools called gadgets to automatically analyze, organize, and sort the data which has been received from the server 22. The data is preferably sorted so that different communities gain access to different portions of the data. For example, actual and potential customers of a vendor of a deployed product may form one community and have access to certain data, while support engineers and product designers may form a second community and have access to another form of the data. As can be seen from the foregoing discussion, the portal 12 offers great flexibility as to how and to whom the data is disseminated. One of the advantages to using the portal 12 is that its functionality can be carried out in a secure, user friendly, web-based environment. Members of a particular community can log in by presenting an identification and/or a password and gain access to current information about a deployed product.

Another advantage to using the portal 12 is that it can be used to receive data from server 22 and to upload information and data to the server 22. Thus, an engineer, in communication with portal 12, can remotely receive visual data pertaining to a deployed product captured by visual data device 32 as well as send information to the visual data device 32.

With continued reference to FIG. 1, there is illustrated a plurality of exemplary electronic devices in communication with portal 12 which may be utilized to communicate with a visual device 32 via portal 12, server 22, wireless LAN 24, and mobile device 26. For example, goggles 14 may be utilized by a viewer of visual data captured by visual data device 32. Such goggles 14 may facilitate the viewing of monographic or stereoscopic visual data captured by a video borescope or stereo image lens respectively. Computer 16 may be any computing device capable of receiving data and displaying it, as for example on a computer screen, and issuing commands, as for example through a keyboard associated with computer 16. In addition, a mobile computer 18, such as a tablet PC, may be used to send and receive data to and from visual data device 32.

While described with respect to goggles 14, computer 16, and mobile computer 18, the present invention is broadly drawn to encompass any and all means of receiving and displaying visual information as well as issuing control commands to control the acquisition of such visual data. For example, other devices which may be used in communication with portal 12 to receive and display visual data include 3D auto-stereoscopic projection systems, and 3D goggles.

Having thusly described the interaction of the components comprising system 10, there is herein provided a preferred embodiment whereby the present invention may be employed and utilized. The present invention can provide a live video image from a visual data device 32, such as a standard borescope, directly connected to a mobile device 26 comprised of a wireless PC maintenance tablet. The wireless PC tablet can be carried around by a mechanic or the like and may serve as the mechanic's repository for work instructions, electronic manuals, and the like in a field or shop aerospace environment. The mechanic can thereby move freely about the work environment and position the borescope in desired proximity to a deployed product such as and aircraft engine under repair. The wireless PC tablet is logged on to wireless LAN 24 and therefore communicates with server 22. Server 22 has a unique IP address and is therefore accessible via the internet by portal 12. As a result, sections of the PC tablet desktop (or the entire desktop) can be shared within the Portal architecture, consisting of portal 12 and the electronic devices in communication with portal 12, to allow for remote viewing, collaboration, and control of the borescope equipment between the operator and remote persons, such as engineers, managers, and customers sitting at their work or home PCs from anywhere in the world via an ordinary web browser.

Alternatively, a web-based application could be used to directly control the borescope, provide the image, and allow for communications remotely via a web interface. The remote control borescope feature builds upon local software-based borescope controls developed and sold by Olympus America Inc. of Melville, N.Y., and the Internet eBusiness Portal managed by Pratt & Whitney of Connecticut. Note that this wireless tablet/Portal system combination allows for a field mechanic to have all of the advantages of broadband internet connectivity and collaboration support with customer and factory personnel, including, static picture, live video, voice-over-IP, touchscreen white board, and other PC functionalities in a mobile shop or field environment.

In an alternative embodiment, visual data device 32 consists of a stereo image lens marketed by Olympus America Inc., which provides a left eye-right eye double image. The double image data is accessible by remote viewers via a host of electronic devices in communication with portal 12 including, but not limited to, three dimensional, stereo viewing devices, such as glasses, goggles, or the autostereographic viewing system now under development by the University of Strathclyde in Scotland. Such a configuration allows for remote, 3D viewing of the live video image in a remote lab or location for in-depth analysis. The remote 3D viewing permits natural three dimensional interpretation of the subject matter for significantly enhanced viewing and diagnostics by a remote person, and has broad applications in many other fields besides aerospace, including manufacturing, medical, surveillance, pharmaceutical, and other types of inspection activities.

Because the present invention provides two-way communication between a visual data device 32 and remotely located electronic devices used to view such data, viewers may issue control commands to the visual data device 32 based upon the visual data they receive. For example, a viewer using goggles 14 to view auto-stereoscopic data captured by a stereo image lens functioning as visual data device 32, may send a command instruction to alter the orientation of visual data device 32. Such a command may cause the stereo image lens to alter its orientation by zooming in on an engine part or panning left or right about a deployed product. In this manner, remote viewers of visual data acquired by visual data device 32 may analyze visual data as well as direct the acquisition of such data.

Advantages of such a system include allowing multiple experts in different locations to quickly and effectively collaborate on an inspection of a turbine engine part, then make and document a decision that would either remove the engine for overhaul or allow for continued operation. The savings in time and money would be significant, as presently a part requiring inspection would have to wait until the appropriate experts could physically travel to the site in order to perform the inspection.

While described in detail with respect to a stationary server 22 located, for example, in an aircraft hangar, the server 22 may in an alternative embodiment be located upon a moveable platform. One advantage of locating server 22 on a moveable platform is to enhance the ability of system 10 to provide more flexible remote acquisition of data. For example, a moveable platform such as a helicopter could have installed upon it a server 22 in internet communication with portal 12. The helicopter could be flown to a remote location and land amongst one or more deployed helicopters requiring diagnostic attention. Wireless LAN 24 is configured to encompass the area within which the helicopters reside. As a result, mechanics carrying mobile devices 26, such as PC tablets, connected to video borescopes can position the borescopes to gather visual data of, for example, the helicopter's engines. In this manner, remote viewers communicating with portal 12 can both receive the visual data collected by the borescope and issue control commands to interactively examine the engines.

It is apparent that there has been provided in accordance with the present invention a remote tablet-based internet inspection portal system which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An integrated system comprising:
a portal having at least one software tool for analyzing, organizing and sorting at least one form of data for access by at least one community of users, each community having secured access to at least one form of data relevant to said community;
a server communicating with said portal;
at least one wireless local area network in communication with said server;
at least one mobile device in wireless communication with said at least one wireless local area network;
a visual data device in communication with said at least one mobile device; and
a means for enabling two-way communications between said portal and said server,
wherein said at least one mobile device comprises a PC tablet.

2. The integrated system of claim 1, wherein said portal may be accessed by at least one mobile device in communication with said portal.

3. The integrated system of claim 1, wherein said at least one local area network is physically integrated with said server.

4. The integrated system of claim 1, wherein said at least one local area network is in wireless communication with said server.

5. The integrated system of claim 1, wherein said visual data device comprises a borescope.

6. The integrated system of claim 5, wherein said borescope communicates with said mobile device via a data feed wire.

7. The integrated system of claim 6, wherein said mobile device comprises at least one USB port for receiving said data feed wire.

8. The integrated system of claim 1, wherein said visual data device comprises a stereographic viewing system.

9. The integrated system of claim 8, wherein said stereographic viewing system comprises a stereo image lens in communication with said at least one mobile device.

10. The integrated system of claim 9, wherein said at least one mobile device comprises at least one USB port for receiving data from said stereo image lens.

11. The integrated system of claim 1, wherein said server is addressable by a unique IP address and wherein said server hosts at least one web page.

12. The integrated system of claim 1, wherein said server is located on said at least one movable platform comprising one of the following: a boat, an airplane, a spacecraft, an automobile or a truck.

13. A method for providing remote, interactive visual analysis of an apparatus, comprising the steps of:
providing a portal having at least one software tool for analyzing, organizing and sorting visual data for access by at least one community of users, said portal in communication with at least one electronic device;
providing a server in two-way communication with said portal via the internet;
integrating said server into a wireless local area network;
connecting at least one mobile device to said local area network;
providing said visual data from at least one visual device to said at least one mobile device;
receiving said visual data at said at least one electronic device;
accessing securely via said server said visual data relevant to each of said at least one community of users; and analyzing a turbine engine of the apparatus using said visual data.

14. The method of claim 13, comprising the additional step of issuing control commands to said at least one visual device from said at least one electronic device.

15. The method of claim 14, wherein said control commands are issued in response to receiving said visual data by said at least one electronic device.

16. The method of claim 15, further comprising altering an orientation of said visual device in accordance with said control commands.

17. The method of claim 13, wherein said receiving of said visual data is limited by a community affiliation of said one or more electronic devices.

* * * * *